Oct. 27, 1925.
E. H. BARBE
1,558,452
GASOLINE GAUGE
Filed Jan. 6, 1922
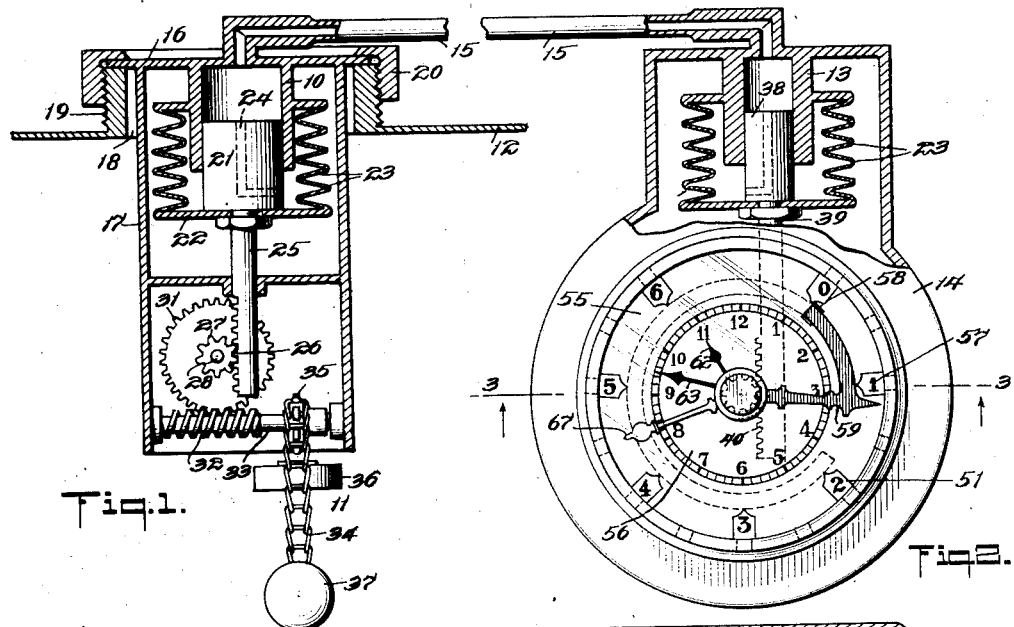
Fig.1.
Fig.2.
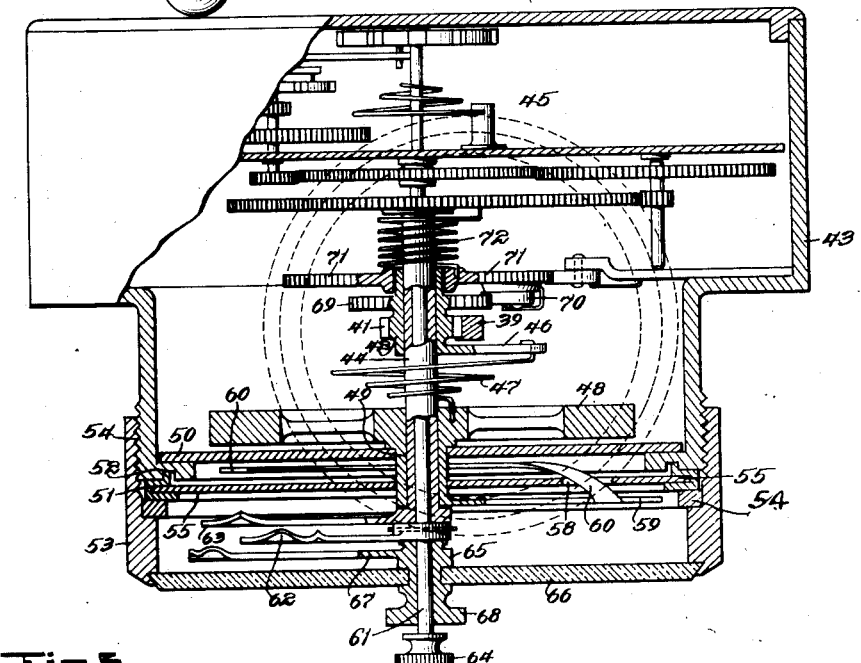
Fig.3.
INVENTOR.
*Edgar H. Barbe*
BY
*Warren S. Orton*
ATTORNEY.

Patented Oct. 27, 1925.

1,558,452

UNITED STATES PATENT OFFICE.

EDGAR H. BARBE, OF NEW YORK, N. Y.

GASOLINE GAUGE.

Application filed January 6, 1922. Serial No. 527,467.

*To all whom it may concern:*

Be it known that I, EDGAR H. BARBE, a citizen of the United States, and resident of New York city, in the county of New York and State of New York, have invented certain new and useful Improvements in Gasoline Gauges, of which the following is a specification.

The invention relates in general to a float controlled indicator mechanism of general application and specifically relates to a means for indicating at a remote station the amount or level of liquid in a liquid containing receptacle such as the fuel tank in an automotive vehicle.

In general the primary object of the invention when considered in its specific relation to its use on a vehicle, is to provide a simple, accurate, easily readable indicator which can be mounted on the instrument board of the vehicle, and which will function independently of any jarring or vibration from the vehicle and without necessity of any charging with operating power, or in fact without any attention whatsoever on the part of the operator.

The invention features a float controlled mechanism disposed in position to be actuated by the change in liquid level of the liquid to be indicated, a remote indicator station with suitable indicator mechanism, and a fluid containing conduit therebetween, connected at one end to the float mechanism to cause the same to actuate the fluid and connected at the other end to the indicator mechanism to control the same by the movement of the fluid.

In such constructions, and especially where the liquid receptacle has a large horizontal area compared to its depth the fall of liquid level per volumetric discharge from the receptacle is relatively small and it is usually necessary to include multiplying gears or the like in the indicator to obtain the required large range of indicator pointer movement. This adds to the cost of the indicator and introduces an objectionable frictional resistance to the desired ease of movement and quick responsiveness of the indicator pointer to small changes in volume of the receptacle contents.

Accordingly, another object of the invention is to provide in effect a direct fluid drive between the float control mechanism and the indicator, which drive will attain the desired multiplication in indicator pointer movement and without the necessity of interposing friction creating mechanism.

I attain this phase of the invention by causing the float to actuate a piston in a relatively large diametered cylinder forming one end of the fluid conduit and causing a piston in a relatively small diametered cylinder at the other end of the conduit to act practically in a direct mannner on the indicator pointer.

When such indicators are mounted on a movable support such as a vehicle, the jarring of the same, the swaying of the liquid in the receptacle, the inertia of the movable parts and other known factors all contribute to an unsteadiness of the indicator pointer in its movement over its coacting dial.

The present invention has for another object the providing of dampening means for steadying the movement of the indicator over its dial so that it will not be influenced by any factor present except the actual lowering of liquid in the receptacle.

This phase of the invention is attained in two ways, first by interposing a resistance to the free flow of fluid in the connecting conduit and second by driving through a spring and inertially controlled fly wheel secured to the indicator pointer.

Still another object of the invention considered in its applicability to a fuel supplying system is to provide means for indicating on one dial and by means of a single simplified instrument the consumption of fuel per unit of time.

This object is attained by combining with the indicator hereinbefore discussed, a clock with the hands thereof coacting with a clock face shown on the dial and disposed in such close juxtaposition to the fuel indicator that both the clock readings and the fuel consumption readings can be seen at the same time.

Further featuring a construction which will be self-contained and which may be actuated without power particularly applied for this purpose, the invention features a clock construction which may be wound by the incidental movement of the float controlled mechanism.

Still another object of the invention is to provide a dial and an indicator pointer therefor, which will clearly designate by a visual alarm the approach of an empty condition in the tank and another object in connection with the dial feature is to provide a simple form of adjustable numerals movable about the periphery of the dial so that the device may be readily adjustable to fit different size receptacles or tanks.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings, Figures 1 and 2 coact to illustrate a preferred embodiment of the invention and in which Figure 1 is a vertical sectional view of the portion of the device which is intended to be mounted on and in the receptacle or tank containing the liquid to be measured;

Figure 2 is a view in front elevation of the portion of the device which forms the indicating station and which is shown with certain parts broken away to show internal constructions; and Figure 3 is an enlarged horizontal sectional view taken through the indicator station and taken on the line 3—3 of Figure 2.

In the following description and in the claims, parts will be identified by specific names for convenience of expression but they are intended to be as generic in their application to similar parts as the art will permit.

In general the device includes a closed fluid containing conduit comprising a piston cylinder 10 at one end actuated by float controlled mechanism 11 in the tank 12 containing the liquid to be measured and a similar piston cylinder 13 at the other end for actuating the indicator 14 and which cylinders are connected by the necessary length of tubing 15.

The cylinder 10 is of relatively large internal cross-section, depends from a top plate 16 of a cylindrical casing 17 which casing is designed to extend through an opening 18 in the top of the tank 12 and rests upon a threaded throat 19 outlining the opening 18 to close the same. A closing cap 20 in threaded engagement with the throat acts to demountably hold the casing 17 in place. The lower end of the cylinder 10 is opened and a piston 21 is slidably mounted therein and extends therefrom. The exposed end of the piston is secured to a movable plate 22 constituting the lower end of an accordion like member 23 which accordion is affixed at its upper end to an outstanding flange 24 extending from the side of the cylinder 10. The piston 21 is provided with an L-shaped by-pass liquid conducting passageway 24 which places the interior of the cylinder in fluid communication with the interior of the accordion and at the same time offers a restriction to any free flow of the fluid past the piston. The piston is provided with a stem 25 which has a rack 26 formed on one side thereof and designed to mesh with a pinion 27 fixed to a shaft 28 journalled in the lower portion of the casing 17. The shaft is rotated by a float controlled construction comprising a gear 31 secured to the shaft 28 and meshing with a worm 32 formed on a shaft 33 journalled in the casing 17. A chain 34 is passed over a sprocket 35 mounted on the shaft 33. The chain is provided at one end with a float 36 and at the other end with a counterbalancing weight 37. It will be understood that the lowering of the liquid level in the tank 12 will cause the floats to pull the piston downwardly and against the restraining action of both the accordion 23 and of the resistance caused by the fluid flow through the constricted passageway 24.

The corresponding part of the fluid conduit at the opposite end in the indicator is similar to the cylinder parts thus described, except that in this case the cylinder 13 is of relatively small internal diameter and its piston 38 fitting therein is correspondingly smaller than the diameter of the piston 21. By this construction it will be appreciated that a small movement of the piston 21, due to a small fall in liquid level of the liquid being measured will effect a relatively greater lifting movement of the piston 38 and thus provide a multiplying action between the two pistons. The stem 39 depending from the piston 13 is provided with a rack 40 which is in constant mesh with a pinion 41 forming part of a rotary member 42 journalled for free rotary movement in the indicator casing 43. In the specific form of the invention illustrated in Figure 3 the member 42 is loosely mounted upon an hour hand carrying shaft 44 of a clock mechanism 45 contained in the casing 43. The member 42 is provided at its front end with a laterally extending lever 46 which is connected through a coiled driving spring 47 with a rotary damper 48 in the form of a heavy rimmed fly-wheel loosely mounted upon the shaft 44. The fly-wheel is provided with a forwardly extending hub 49 journalled in a mounting plate 50 carried by the mechanism containing casing 43. A plurality of numeral carriers of which seven carry the numerals 0–6 are adjustably mounted on the periphery of the dial 55 and are contained in a guideway formed at the front face of the casing 43. The numeral carriers are designed to be secured in position by a retaining ring 53 which is in screw threaded engagement with the casing 43 as shown at 54 with the forward end of the casing 43. This ring 53 acts through a compressible annular washer 54 to secure the numeral carriers in any desired preset position. The dial is provided with a clock face 56. The numerals when in preset position indicate some characteristic of the liquid in the tank, such for instance, as the number of gallons used or remaining in the tank, or the linear depth of the liquid used or remaining in the tank. The dial is provided between the clock face and the scale with an opening 58. The outer end of the hub 49 is provided with an indicator pointer 59 which points to the scale 57 formed by the numerals 51. The pointer is preferably of some color contrasting to the color of the face of the dial so that it may be readily seen. The pointer is provided with a curved extension 60 which is flexible and extends through the opening 58 in the dial. This extension is likewise colored preferably red and it is apparent by this construction that when the pointer is in the position adjacent the character "6" on the scale, all of the extension, hereinafter referred to as a notice impelling member is hid back of the dial, and that as the pointer advances towards and past the position shown in Figure 2, more and more of the member 60 will be exposed across the face of the dial. When the exposed part of the red circle disappears the operator knows that the tank is empty and other alarming condition is present.

The clock mechanism 45 includes a long hour hand shaft 61 which extends from front to rear of the indicator and which provides a support for the long tube constituting the minute hand shaft 44. The hour hand shaft is provided in advance of the dial with an hour hand 62 and similarly the minute hand shaft is provided with a minute hand 63 both coacting with the clock face 56 to provide a conventional form of clock dial at the front of the indicator. The forward end of the shaft 61 is provided with a clock resetting button 64 by means of which the clock can be reset in the manner well known in connection with conventional forms of clock constructions. The shaft 61 is provided immediately in rear of the button 64 with a rotatable hub 65 loosely mounted on the shaft and in turn providing means for securing the center of a glass plate 66. The plate is secured at its periphery to the outer end of the retaining ring 53, which thus provides a mounting ring for the glass cover. The hub 65 is provided with a setting hand 67 which is designed to be rotated from the exterior of the casing by means of a thumb nut 68 constituting the outer end of the hub 65. The construction is arranged so that the hand 67 may be rotated about the scale 57 so as to indicate the start or finish of some prescribed movement of the indicator pointer 59.

The present disclosure features an arrangement whereby the clock may be wound by the movement in one direction of the piston stem 39. In order to effect this purpose the member 42 includes a ratchet 69 which works through a pawl 70 carried on one side of a spring winding ratchet 71 to wind the clock spring 72. It is understood from the showing in the upper part of Figure 3 that the clock 45 is of conventional form and novelty is not predicted upon this part of the disclosure.

In operation and assuming that there is a fluid, such as water or glycerine in the conduit formed by the cylinders 10, 13 and the connecting tube 15; that there is a fall of level in the liquid contained in the tank 12; that the indicator pointer 59 is at the character "1" on the scale, then the device is ready for operation. The fall of liquid level in the tank will pull the piston 21 downwardly from its initial position adjacent the top of the cylinder 10 thus causing the same to draw liquid by a suction effect through the tube 15 and out of the cylinder 13 and the accordion associated with the cylinder 13. The fluid will be drawn into the accordion 23 through the restricted passageway or bleeder 24 which will thus act to retard what might otherwise be a rapid or irregular movement of the liquid in the system. The stem 25 will move with a slow, uniform motion and correspondingly the stem 39 will rise with a regular constant movement due to the tendency of the passageway in the piston 38 to resist any rapid lifting movement. The upward movement of the stem 39 will act through the pinion 41 to swing the lever 46 over an arc of movement limited by the possible arc of movement of the indicator pointer. The lever in turn will tend to act through the flexible driving connection provided by the spring 47 to turn the fly-wheel 48 with a slow regular movement. The turning of the fly-wheel will cause the indicator pointer affixed thereto to move from a preceding numeral in the scale towards the next succeeding character, such for instance, as "0" about the scale 57 in an anti-clockwise direction towards the character "1" and thus indicate the amount of fuel consumed. Where it is desired, for instance, to measure the consumption of fuel during a set period of time, the setting hand may be set at any desired position and note taken of the lapsed time necessary for the indicator pointer to reach the preset hand.

At the same time it will be understood that the lifting movement of the stem 39 will act through the one-way driving connection provided by the pawl and ratchet connection 69, 70, to wind the clock and when once set by the manual adjustment of the hour shaft, the clock needs no further attention.

It is further obvious that the act of refilling the tank 12 will cause the floats to act positively on the stem 25 to elevate the piston 21 and this in turn will force the piston 38 to its lowermost position and restore the indicator pointer automatically to its initial position.

Should it be desired to change the space relation of the numeral carriers and thus adjust the scale 57 so as to have some different position relative to the pointer, the outer retaining ring 53 is rotated so as to loosen binding effect on the gasket, after which the carriers may be shifted into the desired position and the parts reassembled into set position as disclosed in Figure 3.

By means of a device of the character disclosed it is possible to obtain accurate readings which are controlled entirely by the liquid level and are independent of pressure conditions in the tank.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination of a cylinder having an open end, a plunger slidably mounted in the cylinder and extending therefrom, an expansible member between the cylinder and plunger and enclosing the open end of the cylinder, means for placing the interior of the cylinder in fluid communication with the interior of said member, a float controlled mechanism operatively connected to the plunger to move the same outwardly from the cylinder and at the same time expand the member on a change of the liquid level controlling said mechanism, a fluid in said cylinder actuated by the piston and mechanism actuated by the moving fluid.

2. In a device of the class described, the combination of a pair of cylinders with unequal internal diameters, a conduit connecting the cylinders, plungers fitted in said cylinders, a fluid in the conduit and between the pistons mechanism for moving one of the plungers and an indicator operatively connected to the other plunger to be actuated by the movement thereof at a rate different from the movement of the mechanism actuated piston.

3. In a tank indicator, the combination of two closed receptacles each including a piston cylinder, a conduit connecting the same, pistons working in said cylinders, a fluid confined in said receptacles, cylinders and conduit, means for moving one of the pistons thereby to cause it to draw the fluid from the other cylinder and receptacle and indicator mechanism actuated by the resulting movement of the piston in said other cylinder.

4. In a device of the class described, the combination of a fluid containing conduit including a cylinder at one end having a relatively large internal diameter and a cylinder at the opposite end having a relatively small internal diameter, pistons fitted in said cylinders, a float controlled mechanism operatively connected to the larger diametered piston to cause the same to move with a fall in the liquid level of liquid controlling the float mechanism, and an indicator operatively connected to the smaller diametered piston whereby the movement of the level fall is multiplied at the indicator by the more rapid movement of the smaller diametered piston.

5. In a device of the class described, the combination of a fluid containing conduit, a float controlled mechanism at one end for moving the fluid in the conduit, a plunger at the other end of the conduit actuated by the fluid and having a greater ratio of movement than the float controlled mechanism, and an indicator pointer operatively connected to the plunger to be actuated by the movement thereof.

6. In a device of the class described, the combination with a fluid containing conduit including a cylinder, a piston slidably mounted in the cylinder, an expansible member and said piston being provided with a restricted fluid conducting passageway between the conduit and said member bypassing the piston.

7. In a device of the class described, the combination with a fluid containing cylinder having an open end, an accordion enclosing said open end, a piston secured to a movable part of the accordion and slidably mounted in said cylinder.

8. In a device of the class described, the combination with a fluid containing cylinder having an open end, an accordion enclosing said open end, a piston secured to a movable part of the accordion and slidably mounted in said cylinder and said piston being provided with a fluid conducting bypass extending therethrough and placing the cylinder in fluid communication with the interior of the accordion.

9. In a device of the class described, the combination with a fluid containing cylinder having an open end, an accordion enclosing said open end, a piston secured to a movable part of the accordion and slidably mounted in said cylinder and mechanism including a rack and pinion power transmission operatively connected to the piston.

10. In a device of the class described, the combination with a fluid containing cylinder having an open end, an accordion enclosing said open end, a piston secured to a movable part of the accordion and slidably mounted in said cylinder, mechanism including a rack and pinion power transmission operatively connected to the piston, a lever driven from the pinion, an indicator pointer and a spring drive between the lever and pointer.

11. In a device of the class described, the combination with a fluid containing cylinder having an open end, an accordion enclosing said open end, a piston secured to a movable part of the accordion and slidably mounted in said cylinder, mechanism including a rack and pinion power transmission operatively connected to the piston, a lever driven from the pinion, a pointer controlling flywheel and a spring drive between the lever and the flywheel.

12. In a device of the class described, the combination of a float controlled mechanism including a fluid actuated piston, an indicator mechanism including a pointer and a flexible driving connection between the piston and the indicator mechanism, said driving mechanism capable of transmitting the movement of the piston to the pointer while dampening out irregularities in the movement of the float controlled mechanism.

13. In an indicator, the combination of a pointer mechanism mounted for rotary movement, and including an inertially controlled member, a fluid actuated piston, and a coiled spring constituting a flexible driving connection between the piston and said inertially controlled member.

14. In an indicator, the combination of a supporting shaft, an indicator controlling flywheel loose on said shaft, a lever loose on said shaft, a flexible driving connection between the lever and flywheel and float controlling mechanism operatively connected to said lever to rotate the same.

15. In a means for indicating a change in liquid level per unit of time, the combination of a combined indicator and clock dial, a clock including an hour hand shaft and a minute hand shaft telescoping one into the other and extending through the dial, hands on said shafts coacting with the clock element of the dial, an indicator pointer loosely mounted on the outer of the clock shafts and coacting with the liquid indicating element of the dial, and float controlled means for actuating said indicator.

16. In a means for indicating a change in liquid level per unit of time, the combination of a combined indicator and clock dial, a clock including an hour hand shaft and a minute hand shaft telescoping one into the other and extending through the dial, hands on said shafts coacting with the clock element of the dial, an indicator pointer loosely mounted on the outer of the clock shafts and coacting with the liquid indicating element of the dial, float controlled means for actuating said indicator and a setting hand coacting with the dial.

17. In a tank indicator the combination of a float controlled mechanism, an indicator mechanism including a single dial provided with a clock face, and with a scale indicating certain characteristics of the liquid governing the actuation of the float mechanism, a clock including hands coacting with the clock face, and an indicator pointer controlled by said float mechanism and coacting with the scale on the dial.

18. In a tank indicator, the combination in one instrument of a clock, a fuel indicator, a single dial coacting with the indicator pointer and with the clock hands and float controlled means for actuating the indicator and thus causing the pointer to move about the dial.

19. In a tank indicator, the combination in one instrument of a clock, a fuel indicator, a single dial coacting with the indicator pointer and with the clock hands, float controlled means for actuating the indicator and thus causing the pointer to move about the dial and a manually set hand coacting with the dial to indicate a set position thereon which may be the start or finish of an indicator pointer movement at some period of time.

20. In a tank indicator, the combination of a float controlled mechanism, an indicator mechanism actuated thereby, a clock and a clock winding mechanism therefor driven from said float controlled mechanism.

21. In a device of the class described, the combination of a clock, an indicating mechanism and a float controlled mechanism operatively connected to the clock to wind the same and also connected to the indicator mechanism to be controlled by the level of the liquid controlling said float mechanism.

Signed at New York city in the county of New York and State of New York this 29th day of Dec. A. D. 1921.

EDGAR H. BARBE.